US012712604B2

(12) United States Patent
Sun et al.

(10) Patent No.: US 12,712,604 B2
(45) Date of Patent: Aug. 18, 2026

(54) CSI REPORTING ENHANCEMENTS FOR TYPE II CODEBOOK

(71) Applicant: Apple Inc., Cupertino, CA (US)

(72) Inventors: Haitong Sun, Saratoga, CA (US); David Neumann, Munich (DE); Dawei Zhang, Saratoga, CA (US); Ghaith Hattab, Santa Clara, CA (US); Ismael Gutierrez Gonzalez, San Jose, CA (US); Konstantinos Sarrigeorgidis, Los Gatos, CA (US); Louay Jalloul, San Jose, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/857,641

(22) PCT Filed: Apr. 25, 2022

(86) PCT No.: PCT/CN2022/089045
§ 371 (c)(1),
(2) Date: Oct. 17, 2024

(87) PCT Pub. No.: WO2023/206013
PCT Pub. Date: Nov. 2, 2023

(65) Prior Publication Data

US 2025/0279808 A1 Sep. 4, 2025

(51) Int. Cl.
*H04B 7/0417* (2017.01)
*H04B 7/06* (2006.01)

(52) U.S. Cl.
CPC ......... *H04B 7/0417* (2013.01); *H04B 7/0626* (2013.01)

(58) Field of Classification Search
CPC ............................ H04B 7/0417; H04B 7/0626
See application file for complete search history.

(56) References Cited

U.S. PATENT DOCUMENTS

2020/0295812 A1* 9/2020 Rahman ............... H04B 7/0695
2022/0085855 A1* 3/2022 Huang ................. H04B 7/0456
(Continued)

FOREIGN PATENT DOCUMENTS

CN 110190941 8/2019
CN 111294145 6/2020
(Continued)

OTHER PUBLICATIONS

Samsung, "Differential reporting for Type 1-15 II CSI", 3GPP TSG RAN WG1 Meeting #91, R1-1720298, Nov. 17, 2017, 7 sheets.
(Continued)

*Primary Examiner* — Jaison Joseph
(74) *Attorney, Agent, or Firm* — Fay Kaplun & Marcin, LLP

(57) ABSTRACT

A user equipment (UE) configured to receive channel state information (CSI) configuration information for reporting type II codebook based CSI feedback, receive CSI measurement resources and transmit the type II codebook CSI feedback to a base station. Also, a base station configured to transmit channel state information (CSI) configuration information to a user equipment (UE) for the UE to report type II codebook based CSI feedback and receive the type II codebook CSI feedback from the UE.

19 Claims, 8 Drawing Sheets

(56) References Cited

U.S. PATENT DOCUMENTS

2022/0094504 A1* 3/2022 Wu .................... H04B 7/0695
2022/0123805 A1* 4/2022 Chung ................ H04B 7/0456
2022/0123891 A1* 4/2022 Ji ......................... H04L 5/0051
2023/0056240 A1* 2/2023 Lee ..................... H04B 7/0456
2023/0131045 A1* 4/2023 Huang ................ H04B 7/0482
375/267
2023/0170963 A1* 6/2023 Wu ..................... H04B 7/0626
370/329
2023/0269612 A1* 8/2023 Muruganathan ...... H04L 1/0027
370/252
2024/0187909 A1* 6/2024 Hindy .................. H04W 24/10
2024/0421877 A1* 12/2024 Frenne ................ H04B 7/0626
2025/0080174 A1* 3/2025 Li ....................... H04B 7/0626
2025/0279808 A1* 9/2025 Sun ....................... H04B 7/063

FOREIGN PATENT DOCUMENTS

WO 2021/159460 8/2021
WO 2021/243632 12/2021
WO 2023/141846 8/2023
WO 2023/173415 9/2023

OTHER PUBLICATIONS

Vivo, "CSI feedback enhancements for Rel-17 URLLC", 3GPP TSG RAN WG1 #104-e, R1-2100437, Jan. 18, 2021, 8 sheets.

Nokia et al., "Feedback transmission of type II codebook", 3GPP TSG RAN WG1 NR Ad-Hoc#2, R1-1711590, Jun. 30, 2017, 6 sheets.

* cited by examiner

Base Station 300

CSI REPORTING ENHANCEMENTS FOR TYPE II CODEBOOK

TECHNICAL FIELD

The present disclosure generally relates to communication, and in particular, to the CSI reporting enhancements for type II codebook.

BACKGROUND

A user equipment (UE) may connect to a fifth generation (5G) new radio (NR) network. In certain types of deployment scenarios, it has been identified that conventional channel state information (CSI) mechanisms may cause a UE with medium or high speed mobility to experience a significant performance loss. There is a need for CSI reporting enhancements configured to improve performance for a UE with medium or high speed mobility.

SUMMARY

Some exemplary embodiments are related to a processor of a user equipment (UE) configured to perform operations. The operations include receiving channel state information (CSI) configuration information for reporting type II codebook based CSI feedback, receiving CSI measurement resources and transmitting the type II codebook CSI feedback to a base station.

Other exemplary embodiments are related to a user equipment (UE) having a transceiver configured to communicate with a base station and a processor communicatively coupled to the transceiver and configured to perform operations. The operations include receiving channel state information (CSI) configuration information for reporting type II codebook based CSI feedback, receiving CSI measurement resources and transmitting the type II codebook CSI feedback to the base station.

Still further exemplary embodiments are related to a processor of a base station configured to perform operations. The operations include transmitting channel state information (CSI) configuration information to a user equipment (UE) for the UE to report type II codebook based CSI feedback and receiving the type II codebook CSI feedback from the UE.

Additional exemplary embodiments are related to a base station having a transceiver configured to communicate with a user equipment (UE) and a processor communicatively coupled to the transceiver and configured to perform operations. The operations include transmitting channel state information (CSI) configuration information to the UE for the UE to report type II codebook based CSI feedback and receiving the type II codebook CSI feedback from the UE.

DETAILED DESCRIPTION

Figure 1:
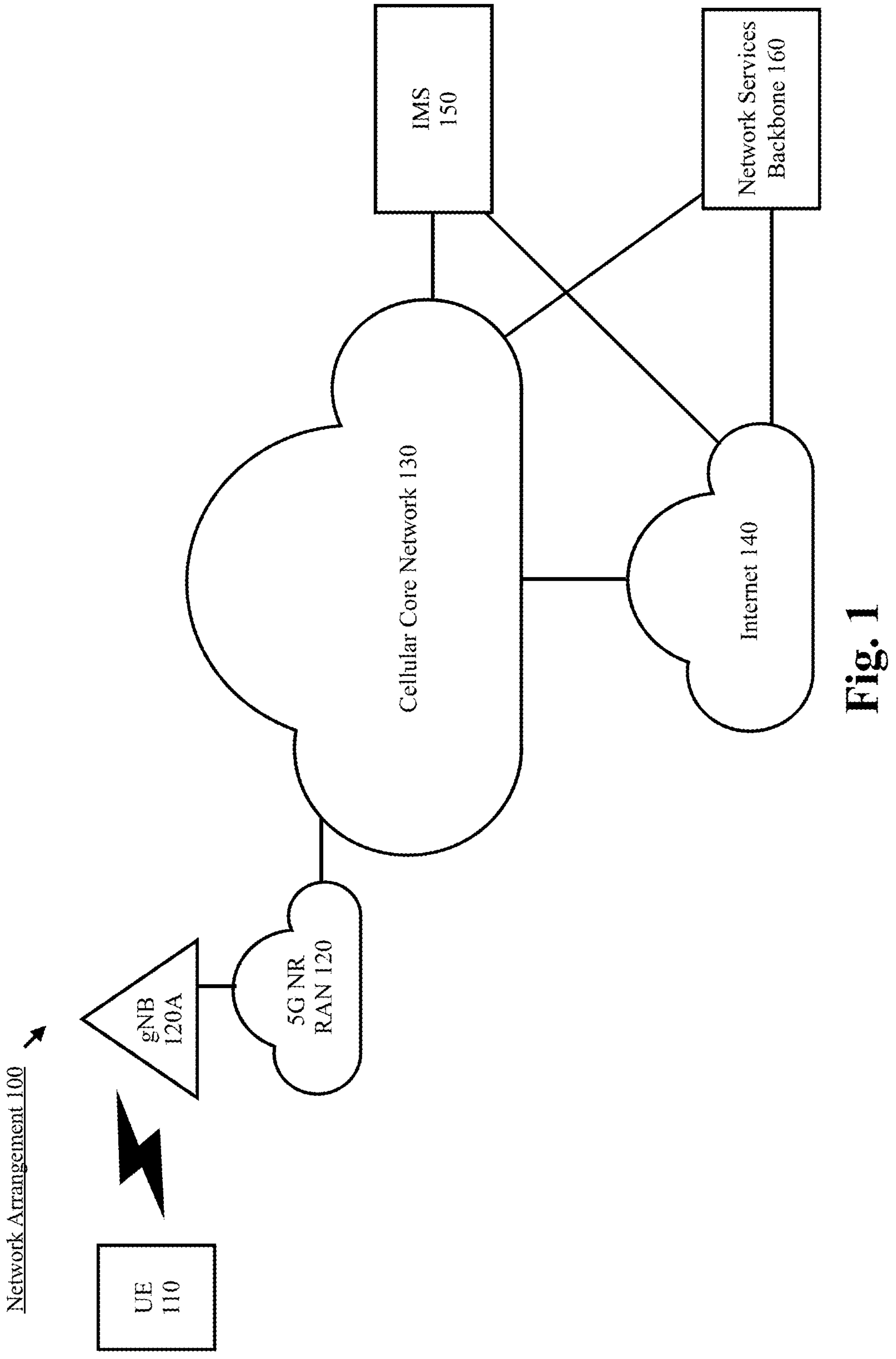
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce channel state information (CSI) reporting enhancements.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a fifth generation (5G) New Radio (NR) network configured with type-II codebook based CSI feedback. However, reference to a 5G NR network is merely provided for illustrative purposes. The exemplary embodiments may be utilized with any appropriate type of network and/pr codebook.

In 5G NR, a type-II multiple input multiple output (MIMO) codebook may be based on a $W_1 * W_2 * W_F$, where $W_1$ represents a spatial basis selection, $W_f$ represents a frequency basis selection and $W_2$ represents a combination coefficient. The type-II codebook may utilize the channel spatial domain properties $W_1$ and the frequency domain properties $W_f$ to construct CSI efficiently. The CSI reporting enhancements for type II codebook introduced herein are configured to exploit the time domain properties of the channel without modifying the spatial and frequency domain basis.

In one aspect, the exemplary embodiments introduce enhancements for precoding matrix indicator (PMI) reporting. Those skilled in the art will understand that a CSI report may include a PMI configured to indicate a UE preferred precoder. The network may then consider the reported PMI when selecting a precoder for a subsequent downlink transmission.

In another aspect, the exemplary embodiments introduce enhancements for channel quality indicator (CQI) reporting. Those skilled in the art will understand that a CSI report may include a CQI to indicate a UE estimated signal to interference and noise ratio (SINR) and/or a preferred modulation and coding scheme (MCS). The network may then consider the reported CQI to ensure that a subsequent downlink transmission is adequately configured for the given channel conditions.

In a further aspect, the exemplary embodiments introduce enhancements for rank indicator (RI) and layer indicator (LI) reporting. Those skilled in the art will understand that a CSI report may include a RI configured to indicate a UE preferred rank (e.g., number of transmission layers). The CSI report may also include a LI configured to indicate a strongest layer index from the set of layers indicated by the RI. The network may then consider the reported RI and LI when configuring downlink transmission layers.

Each of the exemplary enhancements introduced herein are described in detail below. While the exemplary embodiments may provide performance benefits to a UE medium or high speed mobility, the exemplary embodiments are not limited to this type of deployment scenario and may be utilized by any appropriate UE. The exemplary enhancements introduced herein may be used independently from one another, in conjunction with currently implement CSI reporting mechanisms, in conjunction with future implementations of CSI reporting mechanisms or independently from other CSI reporting mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR PAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR PAN 120, the UE 110 may transmit the corresponding credential information to associate with the 5G NR PAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
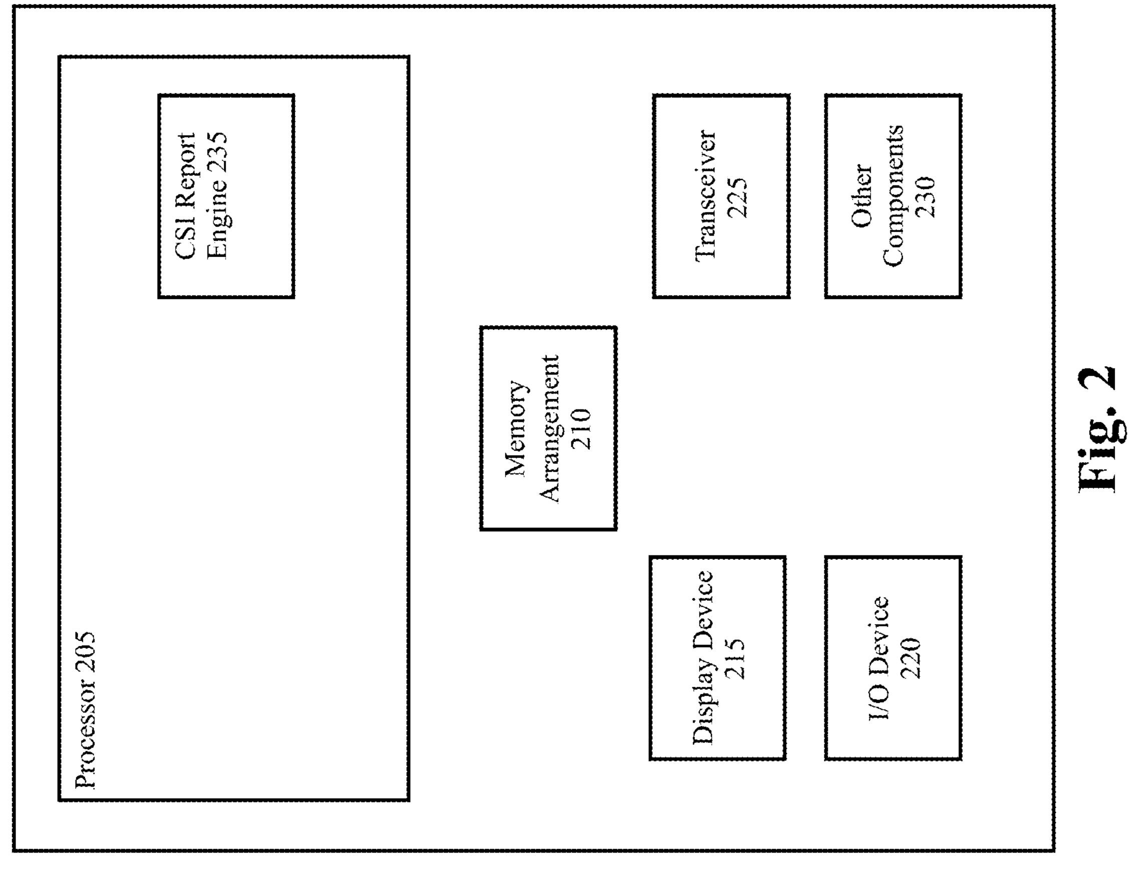
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a CSI report engine 235. The CSI report engine 235 may perform various operations related to reporting CSI including, but not limited to, receiving CSI measurement resources, generating a CSI report and transmitting the CSI report to the network.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
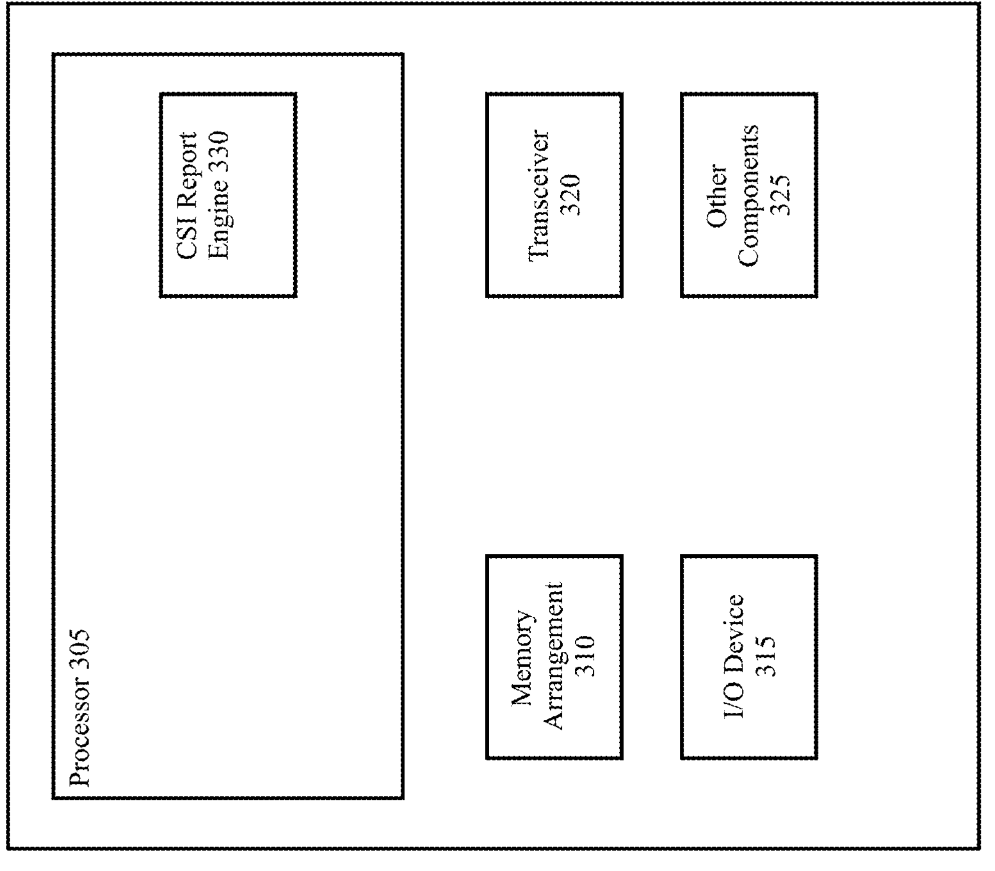
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320 and other components 325. The other components 325 may include, for example, an audio input device, an audio output device, a battery, a data acquisition device, ports to electrically connect the base station 300 to other electronic devices and/or power sources, etc.

The processor 305 may be configured to execute a plurality of engines for the base station 300. For example, the engines may include a CSI report engine 330. The CSI report engine 330 may perform various operations related to CSI reporting including, but not limited to, transmitting CSI configuration information, transmitting CSI measurement resources and receiving a CSI report.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
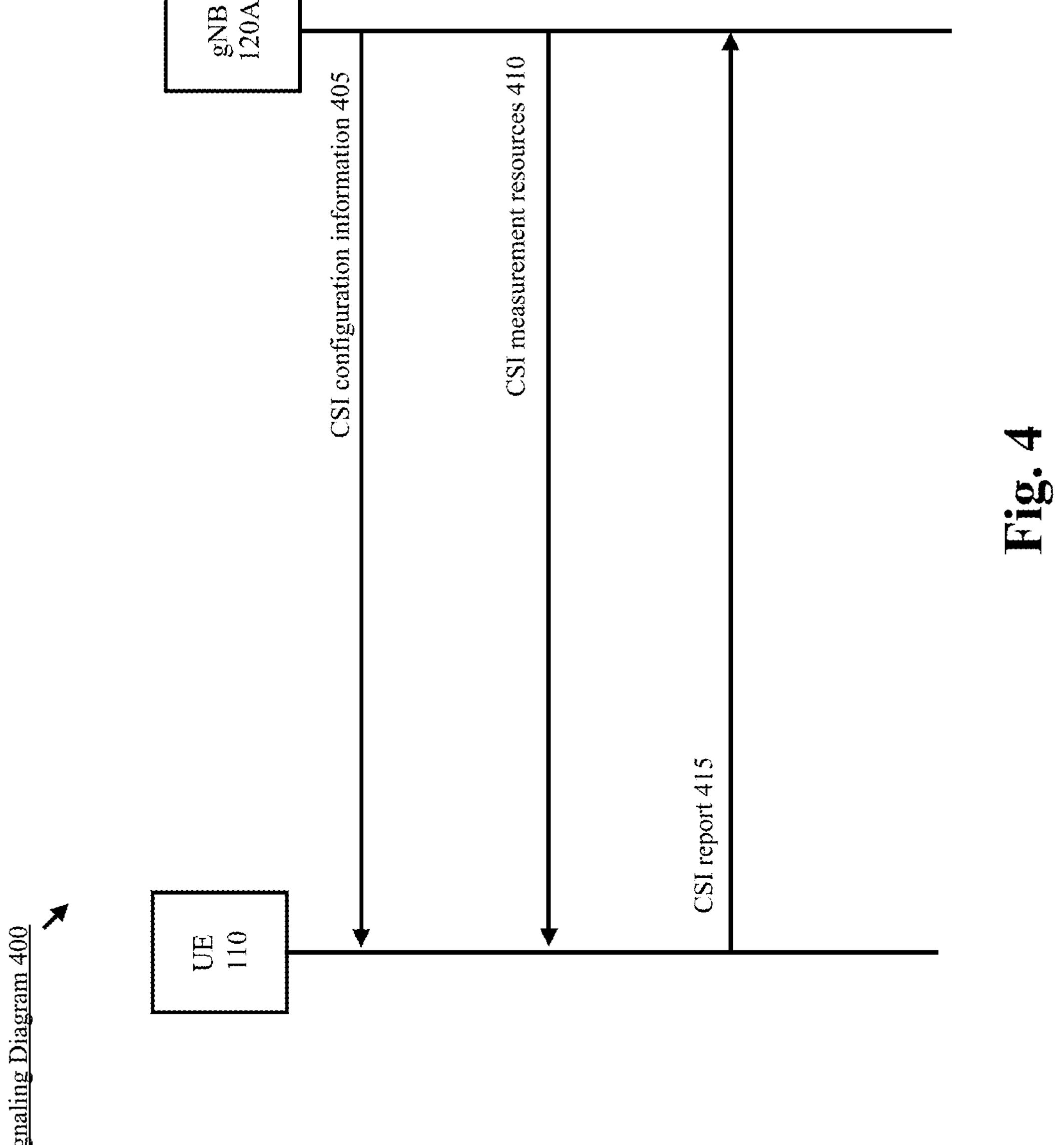
FIG. 4 shows a signaling diagram for reporting channel state information (CSI) feedback according to various exemplary embodiments.

FIG. 4 shows a signaling diagram 400 for reporting CSI feedback according to various exemplary embodiments. The signaling diagram 400 is described with regard to the network arrangement 100 of FIG. 1, the UE 110 of FIG. 2 and the base station 300 of FIG. 3.

The signaling diagram 400 is described with regard to a scenario in which the UE 110 reports CSI feedback to the gNB 120A. Initially, a general overview of this example scenario is described below to provide context for the exemplary CSI reporting techniques introduced herein. The exemplary embodiments include enhancements for PMI reporting, CQI reporting and RI/LI reporting. Each of these exemplary enhancements will be described in detail below after the description of the signaling diagram 400.

In 405, the UE 110 receives CSI configuration information from the gNB 120A. The configuration information may include, but is not limited to, configuration information for CSI measurement resources, the type of CSI to be reported and CSI reporting parameters, e.g., periodicity and slot offset.

The CSI configuration information may be provided to the UE 110 in one or more Radio Resource Control (RRC) messages. For example, the RRC messages may include information element (IEs) such as, but not limited to, CSI-ResourceConfig, CSI-ReportConfig, reportQuantity and codebookConfig. However, the exemplary embodiments are not limited to RRC messages, CSI configuration information may be provided in any appropriate type of message (e.g., medium access control (MAC) control element (CE), downlink control information (DCI), etc.).

The CSI configuration information may include configuration information for the CSI measurement resources. The CSI measurement resources may be provided using synchronization signal block (SSB), CSI-reference signal (RS) or any other appropriate type of signal. The CSI measurement resources may include channel measurement resources (CMR) and interference measurement resources (IMR). The CMRs may include one or more non-zero power (NZP) CSI-reference signals (RS) and/or zero power (ZP) interference measurement resource (IMR). The periodicity and offset of these CMRs resources may be characterized in slots or in any other appropriate manner. Throughout this description, any reference to a particular type of CMR is merely provided for illustrative purposes, the exemplary embodiments may apply to any appropriate type of CMR.

The IMRs may include one or more zero power (ZP) interference measurement resource (IMR), NZP-CSI-RS or a combination thereof. Throughout this description, the terms "ZP IMR" and "CSI-IM" may be used interchangeably to identify the same type of CSI resources and "IMR" may refer to "ZP IMR," "NZP IMR" or a combination of "ZP IMR" and "NZP IMR." The periodicity and offset of these IMRs may be characterized in slots or in any other appropriate manner. Throughout this description, any reference to a particular type of IMR is merely provided for illustrative purposes, the exemplary embodiments may apply to any appropriate type of IMR.

The UE 110 may be configured with one or more sets of CSI measurement resources. Each set of CSI measurement resources may include one or more CMRs and/or one or more IMRs. The network may configure the sets of CSI measurement resources using the CSI configuration information provided in 405 or any other appropriate message. In some embodiments, the network may selectively activate or deactivate a set of configured CSI measurement resources at the UE 110 using a MAC CE, DCI or any other appropriate type of message.

In 410, the UE 110 receives CSI measurement resources. In the signaling diagram 400, the CSI measurement resources are transmitted by the gNB 120A. However, in an actual deployment scenario, the UE 110 may receive CSI measurement resources from multiple serving cells including serving cells deployed by a gNB or base station other than the gNB 120A.

In 415, the UE 110 transmits a CSI report to the gNB 120A. The contents of the CSI report and the transmission of the CSI report may be based on the CSI configuration information provided by the gNB 120A in 405. For example, the network may configure the UE 110 with CSI measurement resources using the CSI-ResourceConfig IE. A CSI report may include one or more different types of CSI (e.g., PMI, CQI, RI, LI, etc.) derived based on CSI measurement resources. The network may specify the type of CSI to be reported using the reportQuantity IE configured to indicate which one or more parameters are to be reported. For periodic and (semi-persistent) SP type II CSI, there may be multiple reporting opportunities for a CSI report at different time instances that are configured by the network using a CSI-reportPeriodicityandOffset IE of the CSI-ReportConfig IE. However, the above examples are merely provided for illustrative purposes and are not intended to limit the exemplary embodiments in any way. The exemplary embodiments introduced below may be utilized in conjunction with any appropriate currently implemented CSI reporting mechanisms or future implementations of a CSI reporting mechanism or independently from other CSI reporting mechanisms.

Alternatively, or in addition to RRC messages, CSI configuration information may be provided in a MAC CE, DCI or any other appropriate type of signal. For example, a MAC CE and/or DCI may be configured to activate and deactivate sets of CSI measurement resources, indicate a CSI report periodicity and slot offset, indicate a codebook type, change a configuration of a CSI parameter previously configured by an RRC message or provide any other type of configuration information relevant to reporting CSI.

In one aspect, the exemplary embodiments introduce enhancements for PMI reporting. PMI may be included in a CSI report to indicate a UE preferred precoder. However, the gNB 120A is not required to utilize the UE preferred precoder and may select a different precoder for subsequent downlink transmissions. The gNB 120A may inform the UE 110 of the selected precoder using DCI or any other appropriate type of signal. The exemplary PMI reporting enhancements introduced herein are described in detail below with regard to the signaling diagram 400 of FIG. 4.

A type II MIMO codebook may be based on a $W_1*W_2*W_F$ structure where $W_1$ represents a spatial basis, $W_f$ represents a frequency basis and $W_2$ represents a compressed combination coefficient. Those skilled in the art will understand that each of these matrices ($W_1$,$W_2$,$W_F$) are defined in various 3GPP Specifications and documents. In this description, these matrices may be used in the manner in which they are defined in the 3GPP Specifications and documents and may be modified in accordance with the exemplary embodiments described herein.

A CSI report may include one or more PMIs. Each PMI may explicitly or implicitly indicate a UE 110 preferred precoder based on the type II codebook structure ($W_1*W_2*W_F$) described above. For example, the PMI may include a spatial component corresponding to the spatial basis of the UE preferred precoder (e.g., $W_1$), a frequency component corresponding to the frequency basis the UE preferred precoder (e.g., $W_f$) and a combination coefficient component corresponding to the combination coefficient of the UE preferred precoder (e.g., $W_2$). Each component of the PMI may be associated with one or more parameters that are identified by a codebook index hard encoded in the 3GPP Specifications. The entries of the codebook indices may be represented by ($i_x$), ($i_{x,x}$) or ($i_{x,x,x}$) (specific examples of which are shown below). Those skilled in the art will understand that are various different types of codebook indices mapped to a variety of different formulas and tables in the 3GPP Specifications. In this description, these codebook indices may be used in the manner in which they are defined in the 3GPP Specifications and may be modified in accordance with the exemplary embodiments described herein. However, the exemplary embodiments are not limited to utilizing the parameters referenced above and may utilize any appropriate type of information to indicate a preferred precoder to the network.

Throughout this description, the term "PMI reporting component" may generally refer to information provided in a CSI report that may be used to derive the UE preferred precoder. In some examples, reference is made to a "spatial basis PMI reporting component" which refers to information provided in a CSI report that may be used to derive a spatial basis of the UE preferred precoder (e.g., $W_1$), a "frequency basis PMI" which refers to information provided in a CSI report that may be used to derive a frequency basis of the UE preferred precoder (e.g., $W_f$) or a "combination coefficient PMI reporting component" which refers to information provided in a CSI report that may be used to derive the combination coefficient the UE preferred precoder (e.g., $W_2$). Each of the PMI reporting components identified above may be associated with one or more parameters identified by a codebook index and/or any other appropriate type of information that may be used to derive the UE preferred precoder.

Under conventional circumstances, when the UE 110 is triggered to provide a CSI report that includes PMI, the UE 110 provides all three PMI reporting components, e.g., $W_1$, $W_2$, $W_F$. However, a scenario may occur where a first CSI report transmitted at a first time and a second CSI report transmitted at a second time are based on the same CSI measurement resources and include the same values for their respective PMI reporting components. This redundant information may be an inefficient use of UE and network resources, particularly, in a low to medium speed mobility scenario.

According to some exemplary aspects, for type II CSI feedback, the network may configure the UE 110 to provide a subset of the PMI reporting components in a CSI report. To provide a general example, at a first time, the UE 110 may be triggered to provide a first CSI report to the gNB 120A based on a set of CSI measurement resources. The first CSI report may include all three PMI reporting components (e.g., $W_1$, $W_2$, $W_F$). At a second time, the UE 110 may be triggered to provide a second CSI report to the UE 110 based on the same set of CSI measurement resources. In contrast to the first CSI report, the second CSI report may only include a single PMI reporting component (e.g., only one of $W_1$, $W_2$, $W_F$). In this type of scenario, on the network side, a preferred UE precoder may be derived based on the PMI reporting components provided in the first CSI report. The network may then utilize the PMI reporting component from the second CSI report to update the UE preferred precoder derived based on the first CSI report. The example provide above is merely provided for illustrative purposes, the exemplary embodiments may enable the UE 110 to provide a CSI report comprising any subset of PMI reporting components.

For a periodic type II CSI report and a SP type II CSI report, each of the PMI reporting components may be reported with a different periodicity. In one approach, a CSI report comprising all three PMI reporting components may be reporting with a larger periodicity and a CSI report comprising only one or two PMI reporting components may be reported with a smaller periodicity. For example, the spatial basis PMI reporting component $W_1$ and the frequency basis PMI reporting component $W_f$ may be more robust to channel time domain fading than the combination coefficient PMI reporting component $W_2$. Thus, in some examples, the combination coefficient $W_2$ may be transmitted more often using a smaller periodicity than the other PMI reporting components.

Figure 5:
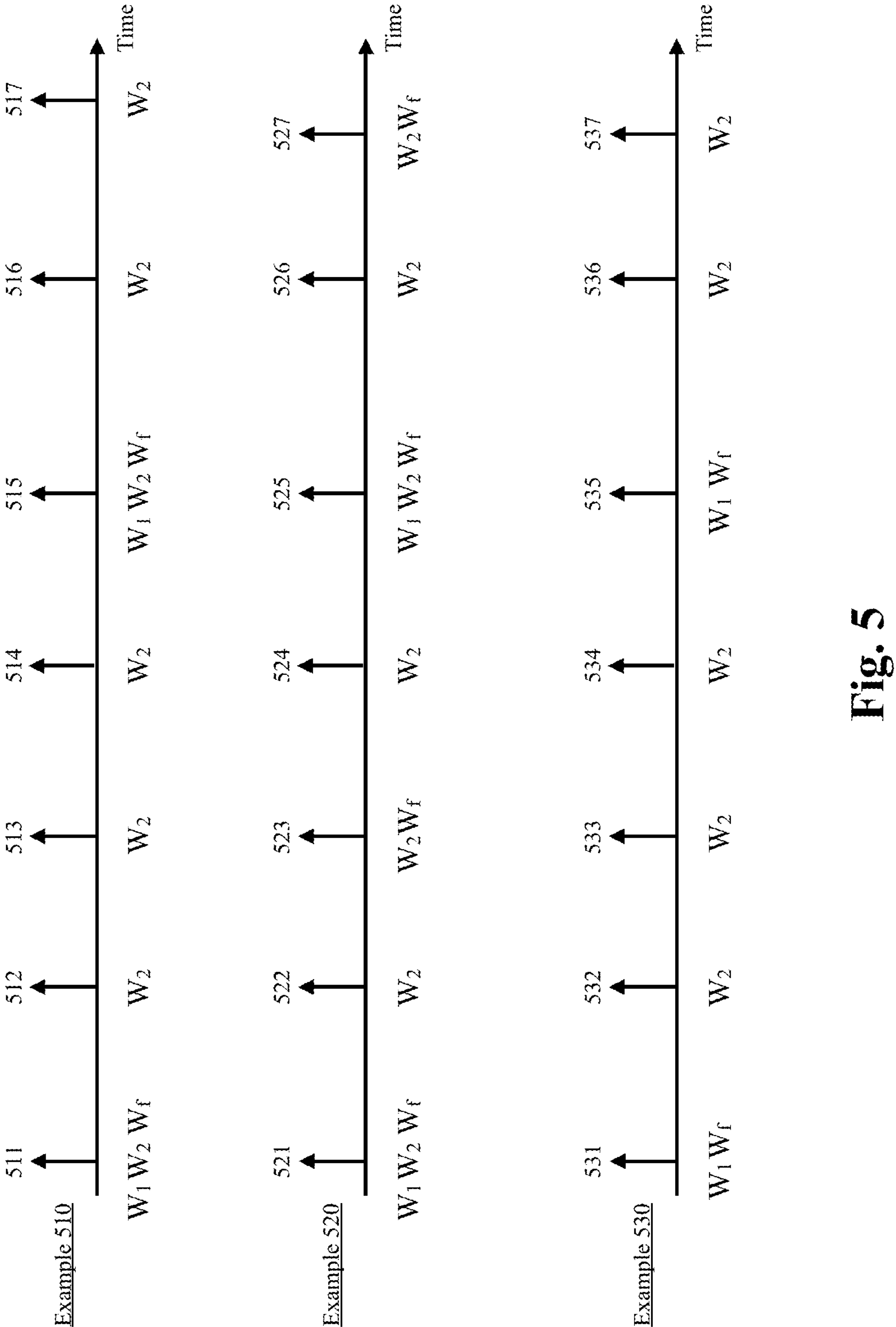
FIG. 5 shows timelines illustrating examples of precoding matrix indicator (PMI) reporting components with different reporting periodicity according to various exemplary embodiments.

FIG. 5 shows timelines illustrating examples of PMI reporting components with different reporting periodicity according to various exemplary embodiments. In example 510, assume a scenario in which the UE 110 is configured with multiple reporting opportunities to transmit a periodic type II CSI report or a SP-CSI type II CSI report. In reporting opportunity 511 the UE 110 transmits a CSI report comprising all three PMI reporting components ($W_1$, $W_2$, $W_F$). In reporting opportunities, 512-514, the UE 110 transmits a CSI report comprising only the combination coefficient PMI reporting component $W_2$. In reporting opportunity 515 the UE 110 once again transmits a CSI report comprising all three PMI reporting components ($W_1$, $W_2$, $W_F$). In reporting opportunities 516 and 517, the UE 110 transmits a CSI report comprising only the combination coefficient PMI reporting component $W_2$. Thus, in example 510, CSI reports comprising all three PMI reporting components ($W_1$, $W_2$, $W_F$) are transmitted with a larger periodicity than CSI reports comprising only the combination coefficient PMI reporting component $W_2$.

In example 520, assume a scenario in which the UE 110 is configured with multiple reporting opportunities to transmit a periodic type II CSI report or an SP-CSI type II CSI report. In reporting opportunities 521 and 525, the UE 110 transmits a CSI report comprising all three PMI reporting components ($W_1$, $W_2$, $W_F$). In reporting opportunities 522, 524 and 526, the UE 110 transmits a CSI report comprising only the combination coefficient PMI reporting component $W_2$. In reporting opportunities 523 and 527, the UE 110 transmits a CSI report comprising two PMI reporting components ($W_2$, $W_F$). Therefore, in example 520, CSI reports comprising all three PMI reporting components ($W_1$, $W_2$, $W_F$) are transmitted with a larger periodicity than CSI reports comprising two PMI reporting components ($W_2$,$W_F$) and CSI reports comprising only the combination coefficient PMI reporting component $W_2$. In example 520, the CSI reports comprising only the combination coefficient PMI reporting component $W_2$ are transmitted with the smallest periodicity.

In example 530, assume a scenario in which the UE 110 is configured with multiple reporting opportunities to transmit a periodic type II CSI report or an SP-CSI type II CSI report. In reporting opportunity 531 the UE 110 transmits a CSI report comprising two PMI reporting components ($W_1$, $W_F$). In reporting opportunities 532-534, the UE 110 transmits a CSI report comprising only the combination coefficient PMI reporting component $W_2$. In reporting opportunity 535 the UE 110 once again transmits a CSI report comprising two PMI reporting components ($W_1$,$W_F$). In reporting opportunities 536 and 537, the UE 110 transmits a CSI report comprising only the combination coefficient PMI reporting component $W_2$. Thus, in example 530, CSI reports comprising two PMI reporting components ($W_1$, $W_F$) are transmitted with a larger periodicity than CSI report comprising only the combination coefficient PMI reporting component $W_2$.

In examples 510-530, the UE preferred precoder may be updated based on subsequent PMI reporting components. For instance, in example 510, the UE preferred precoder may be derived based on the three PMI reporting components provided in a CSI report transmitted during 521. The UE preferred precoder may then be updated based on the combination coefficient PMI reporting component $W_2$ provided in the CSI reports transmitted in 522-524. However, the UE preferred precoder is not required to change during this process. For instance, in example 510, the combination coefficient PMI reporting component $W_2$ provided in the CSI reports transmitted in 522-524 may be the same as the combination coefficient PMI reporting component $W_2$ provided in the CSI report transmitted in 521. The examples described above are merely provided for illustrative purposes and are not intended to limit the exemplary embodiments in any way. The exemplary embodiments may enable any periodic or SP type II CSI report to be have multiple different sets of one or more PMI reporting components each configured with a different reporting periodicity and/or offset.

In another approach, different PMI reporting components may be reported during different reporting opportunities based on factors other than a configured periodicity. For example, assume a scenario in which the UE 110 is configured with multiple reporting opportunities in the time domain to transmit a periodic type II CSI report or an SP-CSI type II CSI report. A CSI report may be configured with a maximum number of bits that may be allocated to PMI reporting components and/or the CSI report as a whole. Initially, the UE 110 generates a first CSI report comprising only the spatial basis PMI reporting component $W_1$ as to not exceed the configured maximum number of bits. The first CSI report is transmitted during a first CSI reporting opportunity. Alternatively, or in addition to CSI omission, subsequent CSI reporting opportunities may be utilized to report the other PMI reporting components. Thus, in this example, the UE 110 generates a second CSI report comprising only the frequency basis PMI reporting component $W_f$ as to not exceed the configured maximum number of bits. The second CSI report is transmitted during a second CSI reporting opportunity. The UE 110 then generates a third CSI report comprising only the combination coefficient PMI reporting component $W_2$ as to not exceed the configured maximum number of bits. The third CSI report is transmitted during a third CSI reporting opportunity. Together the PMI reporting components from the first CSI report, second CSI report and third CSI report may be used to derive the UE preferred precoder.

In the examples described above, the exemplary techniques are referenced as being specific to three different sets of PMI reporting components, e.g., a spatial basis PMI reporting component ($W_1$), a frequency basis PMI reporting component ($W_f$) and a combination coefficient PMI reporting component ($W_2$). Each of the spatial basis PMI reporting component, the frequency basis PMI reporting component and the combination coefficient PMI reporting component may be based on multiple parameters that each associated with a codebook index value. The following list provides some specific, non-limiting examples, of PMI related parameters that are carried in CSI part 1 and belong to one or more of the spatial basis PMI reporting component ($W_1$), the frequency basis PMI reporting component ($W_f$) and the combination coefficient PMI reporting component ($W_2$): rotation factor for spatial basis ($i_{1,1}$), spatial basis indicator ($i_{1,2}$), frequency basis selection window $M_{initial}$, $i_{1,5}$, frequency basis indicator for layer l ($i_{1,6,l}$), rotation factor for spatial basis ($i_{1,1}$), non zero coefficient (NZC) location bitmap for layer l ($i_{1,7,l}$), strongest NZC location for layer l ($i_{1,8,l}$), reference amplitude for layer l ($i_{2,3,l}$), differential amplitude of NZC location for layer l ($i_{2,4,l}$), phase of NZC for layer l ($i_{2,5,l}$), port selection ($i_{1,2}$), frequency basis selection ($i_{1,6}$), NZC location bit map for layer l ($i_{1,7,l}$), strongest NZC location for layer l ($i_{1,8,l}$), reference amplitude for layer l ($i_{2,3,l}$), differential amplitude of NZC for layer l ($i_{2,4,l}$) and phase of NZC for layer l ($i_{2,5,l}$).

The exemplary enhancements described herein may also apply to individual PMI related parameters included in the CSI report. That is, a CSI report may include a subset of the parameters associated with the spatial basis PMI reporting component ($W_1$) or a subset of the parameters associated with the frequency basis PMI reporting component ($W_f$) or a subset of the parameters associated with the combination coefficient PMI reporting component ($W_2$). To provide one example, during a first CSI reporting opportunity, a first CSI report may include all of the PMI related parameters associated with the spatial basis PMI reporting component ($W_1$). In a second CSI reporting opportunity, a second CSI report may include one or a subset of the PMI related associated with a spatial basis PMI reporting component ($W_1$). CSI reports comprising all of the PMI related parameters associated with the spatial basis PMI reporting component ($W_1$) and CSI reports comprising one or a subset of the PMI related parameters associated with the spatial basis PMI reporting component ($W_1$) may each have a different periodicity. In addition, to satisfy a configured maximum number of bits related to PMI and/or the CSI report as a whole, a first CSI report may include one or a subset of the PMI related parameters associated with the spatial basis PMI reporting component ($W_1$). In a second CSI reporting opportunity, a second CSI report may include a second different set of the PMI related associated with the spatial basis PMI reporting component ($W_1$). The examples provided above are not intended to limit the exemplary embodiments in any way. Instead, these examples were provided to illustrate how the exemplary PMI reporting enhancements may be applicable to individual PMI relate parameters.

In some embodiments, a CSI report may include an indication configured to indicate to the gNB 120A that a value of one or more PMI reporting components is the same as a value provided in a previous CSI report. This indication may be utilized in scenarios described above where a first CSI report transmitted at a first CSI reporting opportunity does not contain the same PMI reporting parameters as a second CSI report transmitted at a second CSI reporting opportunity. For instance, in example 510 of FIG. 5, the CSI report transmitted during CSI reporting opportunity 522 may contain an indication that the spatial basis PMI reporting component and the frequency basis PMI reporting component are the same as the previous CSI report transmitted during CSI reporting opportunity 521. In another example, this indication may be used when multiple consecutive CSI reports include different PMI reporting components corresponding to the same UE preferred precoder ($W_1$, $W_2$, $W_f$) to limit the number of bits used for PMI per CSI report and/or the number of bits used for the CSI report as a whole.

In the exemplary embodiments where the CSI report includes an indication configured to indicate to the gNB 120A that a value of one or more PMI reporting components is the same as a value provided in a previous CSI report, the UE 110 may receive a configuration indicating how the base station (e.g., gNB 120A) would interpret this indication. The UE 110 may receive this configuration via an RRC message.

The CSI report may contain a field that is specific to this indication and/or this indication may be provided in an existing field using a reserved value or any other appropriate type of mechanism. There may be one or more indications provided in the CSI report that are each applicable to one or more PMI reporting components. In some examples, an indication may be specific to the spatial basis PMI reporting component ($W_1$), the frequency basis PMI reporting component ($W_f$) and/or the combination coefficient component ($W_2$).

In some examples, the indication may be specific to one or more parameters for a Rel-16 or Rel-17 type II codebook. To provide a non-limiting example, the indication may apply to one or more of the following parameters provided in CSI part 1: rotation factor for spatial basis ($i_{1,1}$), spatial basis indicator ($i_{1,2}$), frequency basis selection window $M_{initial}$, $i_{1,5}$, frequency basis indicator for layer l ($i_{1,6,l}$), rotation factor for spatial basis ($i_{1,1}$), non zero coefficient (NZC) location bitmap for layer l ($i_{1,7,l}$), strongest NZC location for layer l ($i_{1,8,l}$), reference amplitude for layer l ($i_{2,3,l}$), differential amplitude of NZC location for layer l ($i_{2,4,l}$), phase of NZC for layer l ($i_{2,5,l}$). In some examples, an indication may be specific to one or more parameters for a Rel-17 type II port selection codebook. To provide another non-limiting example, the indication may apply to one or more of the following parameters provided in CSI part 1: port selection ($i_{1,2}$), frequency basis selection ($i_{1,6}$), NZC location bit map for layer l ($i_{1,7,l}$), strongest NZC location for layer l ($i_{1,8,l}$), reference amplitude for layer l ($i_{2,3,l}$), differential amplitude of NZC for layer l ($i_{2,4,l}$) and phase of NZC for layer l ($i_{2,5,l}$).

For type II codebook based CSI feedback, time domain differential encoding may be utilized for the following parameters related to PMI: reference amplitude for layer l ($i_{2,3,l}$), differential amplitude of NZC location for layer l ($i_{2,4,l}$) and phase of NZC for layer l ($i_{2,5,l}$). With the time domain differential encoding, the UE 110 may only report the difference between the current measurement and the previous measurement. This may reduce the overhead associated with CSI feedback. In some embodiments, the UE 110 may report the absolute value periodically or based on network triggering. This may mitigate error propagation issues.

In some embodiments, the UE 110 may report the PMI in a differential way as demonstrated by the following equation:

$$W_{gNB}(k+1) = W_{gNB}(k) * W_{UE}(k+1)$$

Here, $W_{gNB}(k)$ may represent the resultant precoder the UE 110 recommends to the gNB 120A at time instance (k) and $W_{UE}(k)$ may represent the differential precoder the UE 110 reports over the air to the gNB 120A at time instance (k). $W_{UE}(k)$ may be limited to either wideband only or may also support subband CSI reporting.

Encoding $W_{UE}(k)$ may be performed similarly to the encoding of the combination coefficient PMI reporting component $W_2$. Among the various entries of $W_{UE}(k)$, a limited subset of NZCs may be reported. The location of the NZC may be reported using a bitmap. The phase and amplitude of the NZC may be reported with differential encoding.

For a high speed UE mobility scenario, when the UE 110 performs time domain filtering for forming PMI, one or more of the following exemplary enhancements may be utilized to address the increased UE complexity and memory consumption associated with this type of scenario. In one embodiment, for PMI reporting, a CSI processing unit (CPU) counting rule may be enhanced where the CPU may occupy a longer time to account for the filtering operation. In other embodiments, an active CSI-RS counting rule may be enhanced where active CSI-RS may occupy a longer time to account for the filtering operation. In further embodiments, a new type II codebook for high speed scenarios may be introduced. For this codebook the UE 110 may report one or more supported triplet parameters, each triplet parameter representing a maximum number of ports for CSI-RS, a maximum number of CSI-RS resources and a maximum total number of ports.

In the above examples, there may be multiple manners of determining a specific duration. In a first example, the UE 110 may report the specific duration to the base station (e.g., gNB 120A). The report may be sent as part of uplink control information (UCI), MAC-CE signaling, or RRC signaling. In some exemplary embodiments the duration is reported by the UE 110 in RRC signaling as part of the UE capability reporting. In a second example, the base station may configure the specific duration. The configuration may be performed as part of RRC signaling. The configuration from base station may be triggered by the request from the UE 110. In a third example, the specific duration may be hardcoded in the specification (e.g., 3GPP standards). When the gNB 120A configures the UE 110 with Type II CSI reporting for high mobility, the extended duration is hardcoded and specified in the 3GPP specification TS38.214.

In a high speed UE mobility scenario, open-loop or semi-open loop CSI reporting may be utilized for one or more of the following parameters related to PMI: rotation factor for spatial basis ($i_{1,1}$), spatial basis indicator ($i_{1,2}$), frequency basis selection window $M_{initial}$, $i_{1,5}$, frequency basis indicator for layer l ($i_{1,6,l}$), rotation factor for spatial basis ($i_{1,1}$), non zero coefficient (NZC) location bitmap for layer l ($i_{1,7,l}$), strongest NZC location for layer l ($i_{1,8,l}$), reference amplitude for layer l ($i_{2,3,l}$), differential amplitude of NZC location for layer l ($i_{2,1}$), phase of NZC for layer l ($i_{2,5,l}$), port selection ($i_{1,2}$), frequency basis selection ($i_{1,6}$), NZC location bit map for layer l ($i_{1,7,l}$), strongest NZC location for layer l ($i_{1,8,l}$), reference amplitude for layer l ($i_{2,3,l}$), differential amplitude of NZC for layer l ($i_{2,4,l}$) and phase of NZC for layer l ($i_{2,5,l}$). Any appropriate number of these parameters may be considered and/or randomly selected for open-loop or semi-open loop CSI reporting.

To facilitate the performance of time domain CSI filtering at the UE 110 in a high speed UE mobility scenario the following exemplary embodiments are introduced. In one example, the UE 110 may recommend that the gNB 120A to always set a timeRestrictionForChannelMeasurements IE to configured and a timerestrictionForInterferenceMeasurements to configured. This recommendation may be provided in capability information, uplink control information (UCI), a CSI report or any other appropriate mechanism. In another example, in an NZP-CSI-RS-ResourceSet, the gNB 120A may set repetition to on when reporting quantity involved CQI, RI, CRI, PMI or LI.

According to some aspects, the exemplary embodiments introduce techniques for utilizing a reportQuantity IE of the CSI configuration information (e.g., 405 of the method 400) (or a similar mechanism) to configure the UE 110 to perform some of the exemplary CSI reporting enhancements described herein. In some examples, a CSI-ReportConfig IE may include a reportQuantity IE that indicates that the UE 110 may separately report the spatial basis PMI reporting component ($W_1$), the frequency basis PMI reporting component ($W_f$) and/or the combination coefficient component ($W_2$). Thus, a first reportQuantity IE of a first CSI-ReportConfig IE may indicate that its corresponding CSI reports may include one or more of the three PMI reporting components and a second reportQuantity IE of a second CSI-ReportConfig IE may indicate that its corresponding CSI reports may include a different one or more of the three PMI reporting components.

In other examples, the reportQuantity IE may be used to configure the UE 110 to separately report specific parameters related to the PMI reporting components (e.g., rotation factor for spatial basis ($i_{1,1}$), spatial basis indicator ($i_{1,2}$), reference amplitude for layer l ($i_{2,3,l}$), differential amplitude of NZC location for layer l ($i_{2,4,l}$), etc.). Thus, a first reportQuantity IE of a first CSI-ReportConfig IE may indicate that its corresponding CSI reports may include one or more parameters related to PMI and a second reportQuantity IE of a second CSI-ReportConfig IE may indicate that its corresponding CSI reports may include a different one or more parameters related to PMI.

In still further examples, the reportQuantity IE may be used to configure the UE 110 to separately report specific parameters related to the CSI reporting components (e.g., CQI, PMI, RI, LI, etc.). Thus, a first reportQuantity IE of a first CSI-ReportConfig IE may indicate that its corresponding CSI reports may include one or more parameters related to CSI reporting and a second reportQuantity IE of a second CSI-ReportConfig IE may indicate that its corresponding CSI reports may include a different one or more parameters related to CSI reporting.

For a high speed UE mobility scenario, when the UE 110 performs time domain filtering for forming PMI, a CPU counting rule may be enhanced so that different numbers of CPUs are counted for PMI reporting based on the reportQuantity IE. For example, when a reportQuantity IE identifies that PMI reporting is to include ($W_1$), ($W_2$), ($W_f$), a first number of CPUs may be counted and when a reportQuantity IE identifies that PMI reporting is to include only ($W_2$) a second different number of CPUs may be counted. In this example, the first number of CSI-RS counted may be larger than the second number of CSI-RS counted.

In addition, for a high speed UE mobility scenario, when the UE 110 performs time domain filtering for forming PMI, a CSI-RS counting rule may be enhanced so that different numbers of active CSI-RS are counted for PMI reporting based on the reportQuantity IE. For example, when a reportQuantity IE identifies that PMI reporting is to include ($W_1$), ($W_2$), ($W_f$), a first number of active CSI-RS may be counted and when a reportQuantity IE identifies that PMI reporting is to include only ($W_2$) a second different number of CSI-RS may be counted. In this example, the first number of CSI-RS counted may be larger than the second number of CSI-RS counted.

According to some aspects, the UE 110 may indicate a preferred CSI reporting setting to the gNB 120A. For example, prior to the configuration information in 405, the UE 110 transmit a signal to the gNB 120A indicating one or more preferred parameters related to CSI reporting. The gNB 120A may but is not required to configure the UE 110 with CSI reporting settings (e.g., CSI-ReportConfig) that are based on the preferred parameters indicated by the UE 110.

In one approach, a CSI report may be configured to indicate UE preferred CSI report settings. For example, in 450, the CSI configuration information may configure the UE 110 to provide a CSI report than includes an indication of one or more parameters that the UE 110 determines may be beneficial for subsequent CSI reporting. These parameters may include but are not limited to, a reporting quantity for one or more different PMI reporting components and a CSI report periodicity and/or slot. The CSI report in 415 may include an indication of the UE preferred CSI report settings. Subsequently, the gNB 120A may then provide further CSI configuration information with a CSI-ReportConfig comprising CSI report settings based on the indication provided by the UE 110 in the CSI report 415.

In another approach, the UE 110 may trigger the transmission of an indication of preferred CSI report settings when a predetermined condition is satisfied. The predetermined condition may be based on a change of the doppler of the channel exceeding a threshold value or any other appropriate factor. In this approach, the indication of preferred CSI report settings may be provided on the physical random access channel (PRACH). The preferred parameters may include but are not limited to, a reporting quantity for one or more different PMI reporting components and a CSI report periodicity and/or slot. For example, the indication may be a PRACH preamble sequence, time domain location or a frequency domain location. Different PRACH preamble sequences, time domain locations and frequency domain locations may each be used to indicate different CSI report setting. In other embodiments, the transmission of the preferred CSI report setting may be provided as uplink MAC CE on the PUSCH. If the UE 110 does not have an uplink grant, the UE 110 may be triggered to send a scheduling request before transmission of the MAC CE on the PUSCH.

Alternatively, or in addition to the UE 110 providing an indication of UE preferred CSI report setting, the UE 110 may also be triggered to transmit sounding reference signal (SRS) to the gNB 120A. The gNB 120A may then derive measurement data corresponding to the channel based on the SRS and configure the UE 110 CSI report setting (e.g., CSI-ReportConfig) based on channel properties.

As mentioned above, the exemplary embodiments also introduce enhancements for CQI reporting. Those skilled in the art will understand that a CSI report may include a CQI to indicate a UE estimated SINR and/or preferred MCS. The network may then consider the reported CQI to ensure that a subsequent downlink transmission is adequately configured for the given channel conditions.

According to some aspects, the network may configure or trigger the UE 110 to report, out of the different reporting quantities, only CQI in a CSI report. For example, a first measurement report transmitted during a first CSI reporting opportunity may include multiple reporting quantities (e.g., PMI, CQI, RI/LI) derived based on a first set of CSI measurement resources. The UE 110 may then transmit a second measurement report during a second CSI reporting opportunity that includes, from the report quantities of the first CSI report, only CQI derived based on the same set of CSI measurement resources.

Figure 6:
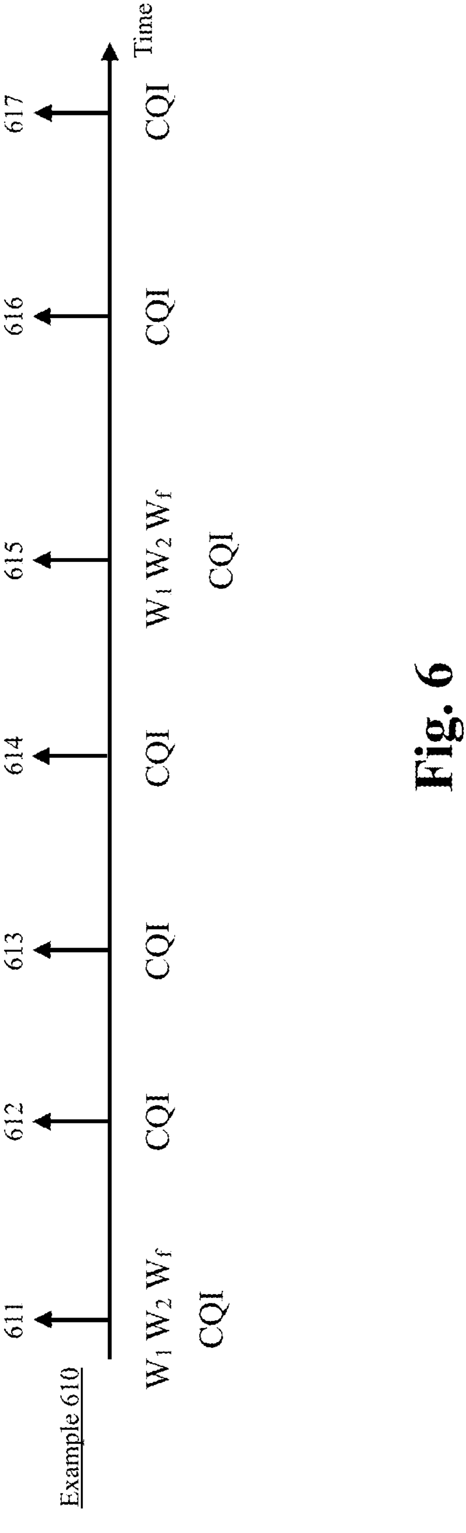
FIG. 6 shows a timeline illustrating an example of reporting channel quality indicator (CQI) with a different periodicity than PMI according to various exemplary embodiments.

For periodic and SP type II CSI report, CQI may be reported with a different periodicity compared to other reporting quantities such as PMI. This may be configured using the CSI configuration information in 405. FIG. 6 shows a timeline illustrating an example of reporting CQI with a different reporting periodicity than PMI according to various exemplary embodiments. In example 610, assume a scenario in which the UE 110 is configured with multiple reporting opportunities to transmit a periodic type II CSI report or a SP-CSI type II CSI report. In reporting opportunity 611 the UE 110 transmits a CSI report comprising all three PMI reporting components ($W_1$, $W_2$, $W_f$) and CQI. In reporting opportunities, 612-614, the UE 110 transmits a CSI report comprising only CQI. In reporting opportunity 615 the UE 110 once again transmits a CSI report comprising all three PMI reporting components ($W_1$, $W_2$, $W_f$) and CQI. In reporting opportunities 616 and 617, the UE 110 transmits a CSI report comprising only CQI. Thus, in example 610, CSI reports comprising all three PMI reporting components ($W_1$, $W_2$, $W_f$) and CQI are transmitted with a larger periodicity than CSI reports comprising only CQI.

Time domain differential encoding may also be considered for the CQI. For time instance K+1, the UE 110 only reports the CQI different between time instance K and time instance K+1. The UE 110 may be triggered to report the absolute CQI periodically or in response to a trigger to mitigate the error propagation.

When subband CQI is configured, the network may configure the UE 110 to report the following independently: only wideband CQI, only subband CQI and both wideband CQI and subband CQI. For example, a first CSI report transmitted at a first CSI reporting opportunity may include both wideband CQI and subband CQI. Subsequently, a second CSI report transmitted at a second CSI reporting opportunity may include only wideband CQI and a third CSI report transmitted at a third CSI reporting opportunity may include only subband CQI. This example is not intended to limit the exemplary embodiments in any way and is merely provided to illustrate the type of CQI that may be reported in different CSI reports when subband CQI is configured.

Figure 7:
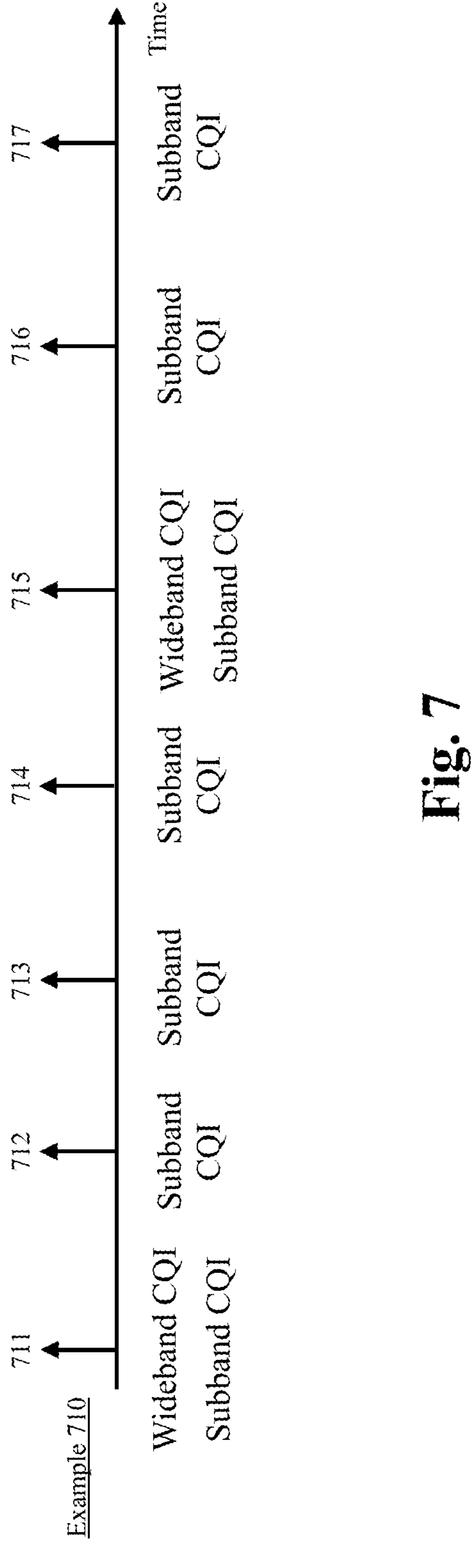
FIG. 7 shows a timeline illustrating an example of reporting wideband CQI and subband CQI with different reporting periodicity according to various exemplary embodiments.

For periodic and SP type II CSI report, wideband CQI and subband CQI may be reported using different reporting periodicity and offset. This may be configured using the CSI configuration information in 405. FIG. 7 shows a timeline illustrating an example of reporting wideband CQI and subband CQI with different reporting periodicity according to various exemplary embodiments. In example 710, assume a scenario in which the UE 110 is configured with multiple reporting opportunities to transmit a periodic type II CSI report or a SP-CSI type II CSI report and subband CQI reporting is configured. In reporting opportunity 711 the UE 110 transmits a CSI report comprising all both wideband CQI and subband CQI. In reporting opportunities, 712-714, the UE 110 transmits a CSI report comprising only subband CQI. In reporting opportunity 715 the UE 110 once again transmits a CSI report comprising both wideband CQI and subband CQI. In reporting opportunities 716 and 717, the UE 110 transmits a CSI report comprising only subband CQI. Thus, in example 710, CSI reports comprising both wideband CQI and subband CQI are transmitted with a larger periodicity than CSI reports comprising only subband CQI. This arrangement CSI reporting periodicity may be beneficial to scenarios where subband CQI is more sensitive to the channel time domain fading compared to the wideband CQI.

As mentioned above, the exemplary embodiments also introduce enhancements for RI and LI reporting. Those skilled in the art will understand that a CSI report may include a RI configured to indicate a UE preferred rank (e.g., number of transmission layers). The CSI report may also include a LI configured to indicate a strongest layer index from the set of layers indicated by the RI. The network may then consider the reported RI and LI when configuring downlink transmission layers.

According to some aspects, the network may configure the UE 110 to skip or omit RI reporting. When the UE 110 skips RI reporting, the UE 110 may assume that the RI is the same as the previous CSI report.

Figure 8:
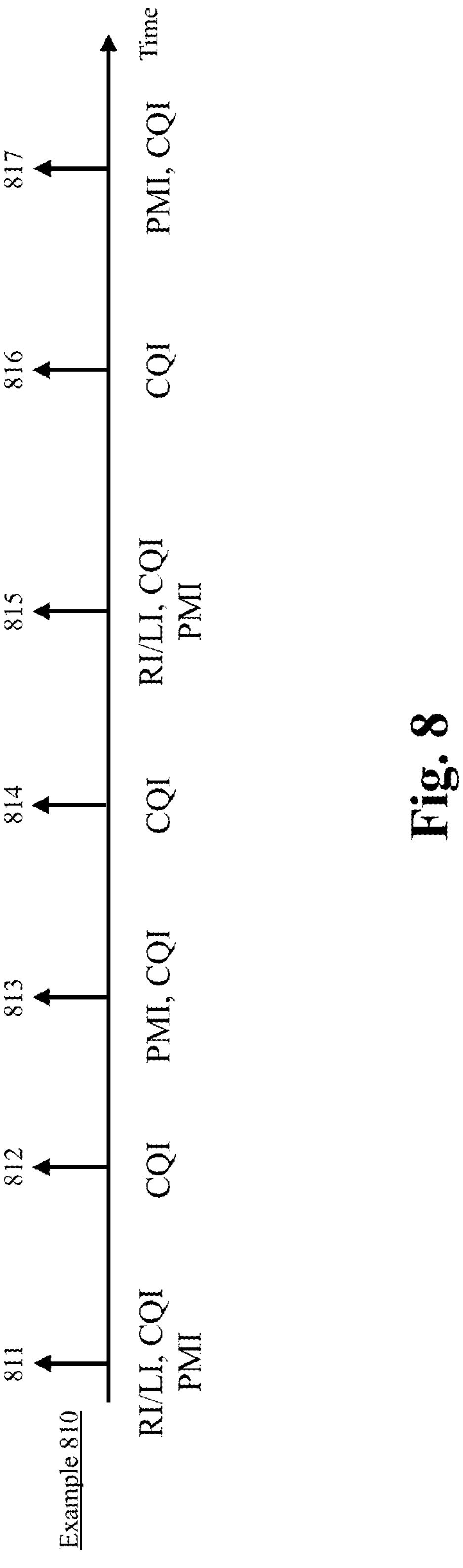
FIG. 8 shows a timeline illustrating an example of reporting rank indicator (RI)/layer indicator (LI) with different reporting periodicity compared to other CSI reporting quantities according to various exemplary embodiments.

For periodic and SP type II CSI report, RI/LI may be reported with different periodicity compared to other report quantities such as, PMI and CQI. This may be configured using the CSI configuration information in 405. FIG. 8 shows a timeline illustrating an example of reporting RI/LI with different reporting periodicity compared to other CSI reporting quantities according to various exemplary embodiments. In example 810, assume a scenario in which the UE 110 is configured with multiple reporting opportunities to transmit a periodic type II CSI report or a SP-CSI type II CSI report. In reporting opportunities 812, 814 and 816, the UE 110 transmits a CSI report comprising CQI. In reporting opportunities 813 and 817, the UE 110 transmits a CSI report comprising PMI and CQI. Thus, in example 810, CSI reports comprising both CQI and PMI are transmitted more often than CSI reports comprising RI/LI. This arrangement of CSI reporting periodicity may be beneficial to scenarios where RI/LI is less sensitive to the channel time domain fading compared to the other report quantities.

EXAMPLES

In a first example, a processor of a user equipment (UE) is configured to perform operations comprising receiving channel state information (CSI) configuration information for reporting type II codebook based CSI feedback, receiving CSI measurement resources and transmitting the type II codebook CSI feedback to a base station.

In a second example, a processor of the first example, wherein the UE is configured to report a PMI using a differential reporting technique based on $W_{gNB}(k+1)=W_{gNB}(k)*W_{UE}(k+1)$, wherein $W_{gNB}(k)$ represents a resultant precoder recommended by the UE to the base station at time instance (k) and $W_{UE}(k)$ represents a differential precoder the UE reports to the base station at time instance (k).

In a third example, a processor of the second example, wherein the differential precoder is limited to wideband only.

In a fourth example, a processor of the second example, wherein the differential precoder supports both wideband and subband.

In a fifth example, a processor of the second example, wherein the UE reports a subset of non-zero coefficients (NZC) among all of the entries of the differential precoder.

In a sixth example, a processor of the fifth example, wherein the UE reports the subset of NZC using a bit map and wherein the UE reports the phase and amplitude of the NZC using differential encoding.

In a seventh example, a processor of the first example, the operations further comprising transmitting a UE preferred CSI report settings to the base station in response to a predetermined condition related to UE mobility.

In an eighth example, a processor of the seventh example, wherein the UE preferred CSI report settings are indicated by a physical random access channel (PRACH) transmission.

In a ninth example, a processor of the seventh example, wherein the UE preferred CSI report settings are provided in an uplink medium access control (MAC) control element (CE).

In a tenth example, a processor of the first example, wherein the UE is configured to transmit a CSI report with a report quantity of only channel quality indicator (CQI).

In an eleventh example, a processor of the first example, wherein transmitting the type II codebook based feedback further comprises transmitting CSI comprising each of a channel quality indicator (CQI) and spatial basis precoding matrix indicator (PMI) reporting component, a frequency basis PMI reporting component and a combination coefficient PMI reporting component using a first periodicity and transmitting CSI comprising CQI without the PMI reporting components using a second different periodicity.

In a twelfth example, a processor of the first example, wherein the type II codebook based CSI feedback utilizes time domain differential encoding for a channel quality indicator (CQI).

In a thirteenth example, a processor of the twelfth example, wherein the UE is configured to report an absolute value for the CQI periodically or in response to a trigger condition.

In a fourteenth example, a processor of the first example, wherein the UE is configured to independently report each of i) wideband channel quality indicator (CQI), ii) subband CQI and ii) both wideband CQI and subband CQI in different time instances.

In a fifteenth example, a processor of the first example, wherein the UE is configured to report wideband channel quality indicator with a first periodicity and subband CQI with a second different periodicity.

In a sixteenth example, a processor of the first example, wherein the UE is configured to omit rank indicator (RI) reporting when a current RI value is a same value as a previously reported RI.

In a seventeenth example, a processor of the first example, wherein the UE is configured to report a rank indicator (RI) with a first periodicity and another CSI report quantity with a second different periodicity.

In an eighteenth example, a user equipment (UE) comprises a transceiver configured to communicate with a base station and a processor communicatively coupled to the transceiver and configured to perform operations comprising receiving channel state information (CSI) configuration information for reporting type II codebook based CSI feedback, receiving CSI measurement resources and transmitting the type II codebook CSI feedback to the base station.

In a nineteenth example, a processor of a base station is configured to perform operations comprising transmitting channel state information (CSI) configuration information to a user equipment (UE) for the UE to report type II codebook based CSI feedback and receiving the type II codebook CSI feedback from the UE.

In a twentieth example, a processor of the nineteenth example, wherein the type II codebook based CSI feedback is for a high speed UE mobility scenario and the base station receives, from the UE, a processing capability of the UE for type II codebook for a high speed UE mobility comprising one or more sets of parameters, each parameter comprising a maximum number of ports for CSI-reference signal (RS), a maximum number of CSI-RS resources and a maximum total number of ports.

In a twenty first example, a processor of the nineteenth example, wherein the type II codebook based CSI feedback is configured for open-loop or semi-open-loop CSI reporting for one or more precoding matrix indicator (PMI) reporting components.

In a twenty second example, a processor of the nineteenth example, the operations further comprising receiving, prior to transmitting the CSI configuration information, a signal from the UE recommending that a timeRestrictionforChannelMeasurement information element (IE) and timeRestrictionforInterferenceMeasurement IE be set to configured in the CSI configuration information.

In a twenty third example, a processor of the nineteenth example, wherein the type II based CSI feedback includes a CSI report configured to indicate a UE preferred CSI report setting.

In a twenty fourth example, a processor of the nineteenth example, wherein the CSI report is received as uplink control information (UCI) on a physical uplink control channel (PUCCH) or a physical uplink shared channel (PUSCH).

In a twenty fifth example, a processor of the nineteenth example, the operations further comprising receiving a UE preferred CSI report settings based on an indication provided on a physical random access channel (PRACH) or in an uplink medium access control (MAC) control element (CE).

In a twenty sixth example, a processor of the nineteenth example, wherein the base station configures the UE to transmit a CSI report with a report quantity of only channel quality indicator (CQI).

In a twenty seventh example, a processor of the nineteenth example, wherein receiving the type II codebook based feedback further comprises receiving CSI comprising each of a channel quality indicator (CQI) and spatial basis precoding matrix indicator (PMI) reporting component, a frequency basis PMI reporting component and a combination coefficient PMI reporting component using a first periodicity and receiving CSI comprising CQI without the PMI reporting components using a second different periodicity.

In a twenty eighth example, a processor of the nineteenth example, wherein the type II codebook based CSI feedback utilizes time domain differential encoding for a channel quality indicator (CQI).

In a twenty ninth example, a processor of the nineteenth example, wherein the base station configures the UE to independently report each of i) wideband channel quality indicator (CQI), ii) subband CQI and ii) both wideband CQI and subband CQI in different time instances.

In a thirtieth example, a processor of the nineteenth example, wherein the base station configures the UE to report wideband channel quality indicator with a first periodicity and subband CQI with a second different periodicity.

In a thirty first example, a processor of the nineteenth example, wherein the base station configures the UE to omit rank indicator (RI) when a current RI value is a same value as a previously reported RI.

In a thirty second example, a processor of the nineteenth example, wherein the base station configures the UE to report a rank indicator (RI) with a first periodicity and another CSI report quantity with a second different periodicity.

In a thirty third example, a processor of the nineteenth example, wherein the CSI configuration information includes a reportQuantity information element (IE) that separately configures different report quantities.

In a thirty fourth example, a processor of the nineteenth example, wherein the CSI configuration information includes a reportQuantity information element (IE) that separately configures one or more of spatial basis precoding matrix indicator (PMI) reporting component, a frequency basis PMI reporting component and a combination coefficient PMI reporting component.

In an thirty fifth example, a base station comprises a transceiver configured to communicate with a user equipment (UE) and a processor communicatively coupled to the transceiver and configured to perform operations comprising transmitting channel state information (CSI) configuration information to a user equipment (UE) for the UE to report type II codebook based CSI feedback and receiving the type II codebook CSI feedback from the UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

reporting, to a base station, a processing capability for type II codebook comprising one or more sets of parameters, each set of parameters comprising a maximum number of ports for channel state information (CSI)-reference signal (RS), a maximum number of CSI-RS resources, and a maximum total number of ports;

receiving CSI configuration information for reporting type II codebook based CSI feedback;

generating the type II codebook based CSI feedback;

receiving CSI measurement resources; and transmitting the type II codebook CSI feedback to a base station.

2. The processor of claim 1, wherein the type II codebook based CSI feedback includes a CSI report comprising at least one of but less than all of a spatial basis precoding matrix indicator (PMI) reporting component, a frequency basis PMI reporting component and a combination coefficient PMI reporting component.

3. The processor of claim 1, wherein the type II codebook based CSI feedback comprises periodic or semi-persistent feedback and transmitting the type II codebook based CSI feedback further comprises:

transmitting CSI comprising each of a spatial basis precoding matrix indicator (PMI) reporting component, a frequency basis PMI reporting component and a combination coefficient PMI reporting component with a first periodicity; and transmitting CSI comprising only one or a subset of the spatial basis PMI reporting component, the frequency basis PMI reporting component and the combination coefficient PMI reporting component with a second periodicity, wherein the first periodicity is larger than the second periodicity.

4. The processor of claim 1, wherein the type II codebook based CSI feedback comprises periodic or semi-persistent feedback and transmitting the type II codebook based CSI feedback further comprises:

transmitting CSI comprising a first subset from a spatial basis precoding matrix indicator (PMI) reporting component, a frequency basis PMI reporting component and a combination coefficient PMI reporting component with a first periodicity; and transmitting CSI comprising a second subset from the spatial basis PMI reporting component, the frequency basis PMI reporting component and the combination coefficient PMI reporting component, wherein the first subset and the second subset include different PMI reporting components.

5. The processor of claim 1, wherein the operations further comprise:

receiving a radio resource control (RRC) message comprising a type II codebook based CSI feedback configuration, wherein the configuration indicates how the base station interprets the type II codebook based CSI feedback including a CSI report comprising an indication that a value of a precoder matrix indicator (PMI) reporting component is a same value as a previously transmitted CSI report.

6. The processor of claim 1, wherein the type II codebook based CSI feedback utilizes time domain differential encoding for a precoder matrix indicator (PMI) reporting component for of a CSI report and wherein the time domain differential encoding indicates a difference between a current measurement and a previous measurement reported in a previous CSI report.

7. The processor of claim 1, wherein the UE is configured to report a PMI using a differential reporting technique based on $W_{gNB}$ (k+1)=$W_{gNB}$ (k)*$W_{UE}$ (k+1), wherein $W_{gNB}$ (k) represents a resultant precoder recommended by the UE to the base station at time instance (k) and $W_{UE}$ (k) represents a differential precoder the UE reports to the base station at time instance (k).

8. The processor of claim 1, wherein the type II codebook based CSI feedback is for a high speed UE mobility scenario.

9. The processor of claim 1, wherein the type II codebook based CSI feedback is configured for open-loop or semi-open-loop CSI reporting for one or more precoding matrix indicator (PMI) reporting components.

10. The processor of claim 1, the operations further comprising:

transmitting, prior to receiving the CSI configuration information, a signal to the base station recommending that a timeRestrictionforChannelMeaurement information element (IE) and timeRestrictionforInterference-Meaurement IE are set to configured in the CSI configuration information.

11. The processor of claim 1, wherein the CSI report is transmitted on uplink control information (UCI) on a physical uplink control channel (PUCCH) or a physical uplink shared channel (PUSCH).

12. The processor of claim 1, the operations further comprising:

transmitting a UE preferred CSI report settings to the base station in response to a predetermined condition related to UE mobility.

13. The processor of claim 1, wherein the CSI configuration information includes a reportQuantity information element (IE) that separately configures different report quantities.

14. The processor of claim 1, wherein the CSI configuration information includes a reportQuantity information element (IE) that separately configures one or more of spatial basis precoding matrix indicator (PMI) reporting component, a frequency basis PMI reporting component and a combination coefficient PMI reporting component.

15. The processor of claim 1, wherein when the UE is configured to perform time domain filtering for PMI, a number of CSI processing units (CPUs) to be counted is based on the reportQuantity IE.

16. The processor of claim 1, wherein when the UE is configured to perform time domain filtering for PMI, the number of active CSI-reference signal (RS) to be counted is based on the reportQuantity_IE.

17. A processor of a base station configured to perform operations comprising:

receiving, from a user equipment (UE), a processing capability for type II codebook comprising one or more sets of parameters, each set of parameters comprising a maximum number of ports for channel state information (CSI)-reference signal (RS), a maximum number of CSI-RS resources, and a maximum total number of ports;

generating, for transmission to the UE, CSI configuration information for the UE to report type II codebook based CSI feedback; and receiving the type II codebook CSI feedback from the UE.

18. The processor of claim 17, wherein the type II codebook based CSI feedback includes a CSI report comprising less than all of a spatial basis precoding matrix indicator (PMI) reporting component, a frequency basis PMI reporting component and a combination coefficient PMI reporting component.

19. The processor of claim 17, wherein the type II codebook based CSI feedback comprises periodic or semi-persistent feedback and receiving the type II codebook based CSI feedback further comprises:

receiving CSI comprising each of a spatial basis precoding matrix indicator (PMI) reporting component, a frequency basis PMI reporting component and a combination coefficient PMI reporting component with a first periodicity; and receiving CSI comprising only one or a subset of the spatial basis PMI reporting component, the frequency basis PMI reporting component and the combination coefficient PMI reporting component with a second periodicity, wherein the first periodicity is larger than the second periodicity.

* * * * *